(12) United States Patent
Ha et al.

(10) Patent No.: US 11,645,415 B2
(45) Date of Patent: May 9, 2023

(54) AUGMENTED REALITY REMOTE COMMUNICATION METHOD AND SYSTEM FOR PROVIDING SECURITY FUNCTION FOR 3D SPACE

(71) Applicant: VIRNECT inc., Seoul (KR)

(72) Inventors: Tae Jin Ha, Gimpo-si (KR); Jea In Kim, Seoul (KR); Soo Hwan Kim, Seoul (KR); Noh Young Park, Paju-si (KR)

(73) Assignee: VIRNECT INC., Seoul (KR)

( * ) Notice: Subject to any disclaimer, the term of this patent is extended or adjusted under 35 U.S.C. 154(b) by 0 days.

(21) Appl. No.: 17/126,974

(22) Filed: Dec. 18, 2020

(65) Prior Publication Data

US 2021/0201586 A1    Jul. 1, 2021

(30) Foreign Application Priority Data

Dec. 30, 2019    (KR) ........................ 10-2019-0178664

(51) Int. Cl.
*G06T 19/00* (2011.01)
*G06T 7/70* (2017.01)
(Continued)

(52) U.S. Cl.
CPC ........ *G06F 21/6245* (2013.01); *G06F 21/604* (2013.01); *G06T 5/002* (2013.01);
(Continued)

(58) Field of Classification Search
CPC ............... G06F 2111/18; G06F 3/0481; G06F 3/04817; G06F 9/4443; G06F 3/04847; G06F 11/3664; G06F 3/012; G06F 3/0304; G06F 3/011–015; G06K 9/00664–00704; G06T 19/00; G06T 17/00; G06T 7/00; G06T 19/006;
(Continued)

(56) References Cited

U.S. PATENT DOCUMENTS

| | | | |
|---|---|---|---|
| 7,266,616 B1 * | 9/2007 | Munshi ................... | G06T 15/00 715/234 |
| 2015/0248224 A1 * | 9/2015 | Krishnan .............. | G06F 3/0482 340/506 |

(Continued)

FOREIGN PATENT DOCUMENTS

| | | |
|---|---|---|
| EP | 0221704 A2 * | 10/1986 |
| KR | 20080052338 | 6/2008 |

(Continued)

*Primary Examiner* — Todd Buttram
(74) *Attorney, Agent, or Firm* — STIP Law Group, LLC

(57) ABSTRACT

Provided are an augmented reality (AR) remote communication method and system for providing a security function for a 3D space. An AR remote communication method of providing, by a computing device, communication within an AR environment based on an image of a three-dimensional (3D) space whose give area is secured includes obtaining a physical space image of a physical space around a user, setting a 3D security area based on the obtained physical space image, performing security processing for converting the physical space image based on the set 3D security area, and providing a security image generated by performing the security processing.

6 Claims, 9 Drawing Sheets

(51) Int. Cl.
   *G06T 7/60*      (2017.01)
   *G06K 9/62*      (2022.01)
   *G06T 5/00*      (2006.01)
   *G06F 21/60*     (2013.01)
   *G06F 21/62*     (2013.01)
   *G06V 20/20*     (2022.01)

(52) U.S. Cl.
   CPC ............... *G06T 7/60* (2013.01); *G06T 7/70* (2017.01); *G06T 19/006* (2013.01); *G06V 20/20* (2022.01)

(58) Field of Classification Search
   CPC ............ G06T 2215/16; H04N 5/272; H04N 2201/3245; A63F 13/10
   See application file for complete search history.

(56) References Cited

U.S. PATENT DOCUMENTS

| | | | | |
|---|---|---|---|---|
| 2016/0049005 | A1* | 2/2016 | Mullins | G06V 10/56 345/420 |
| 2017/0039769 | A1* | 2/2017 | Wu | G06F 3/011 |
| 2018/0075523 | A1* | 3/2018 | Sartori Odizzio | G06F 16/435 |
| 2020/0036957 | A1* | 1/2020 | Ji | H04N 13/271 |
| 2020/0351447 | A1* | 11/2020 | Marston | H04N 5/23299 |
| 2021/0201586 | A1* | 7/2021 | Ha | G06T 19/006 |
| 2021/0287330 | A1* | 9/2021 | Nagano | G06T 7/593 |

FOREIGN PATENT DOCUMENTS

| | | |
|---|---|---|
| KR | 20110109574 | 10/2011 |
| KR | 20140077731 | 6/2014 |
| KR | 101686926 | 12/2016 |

\* cited by examiner

[FIG. 1]
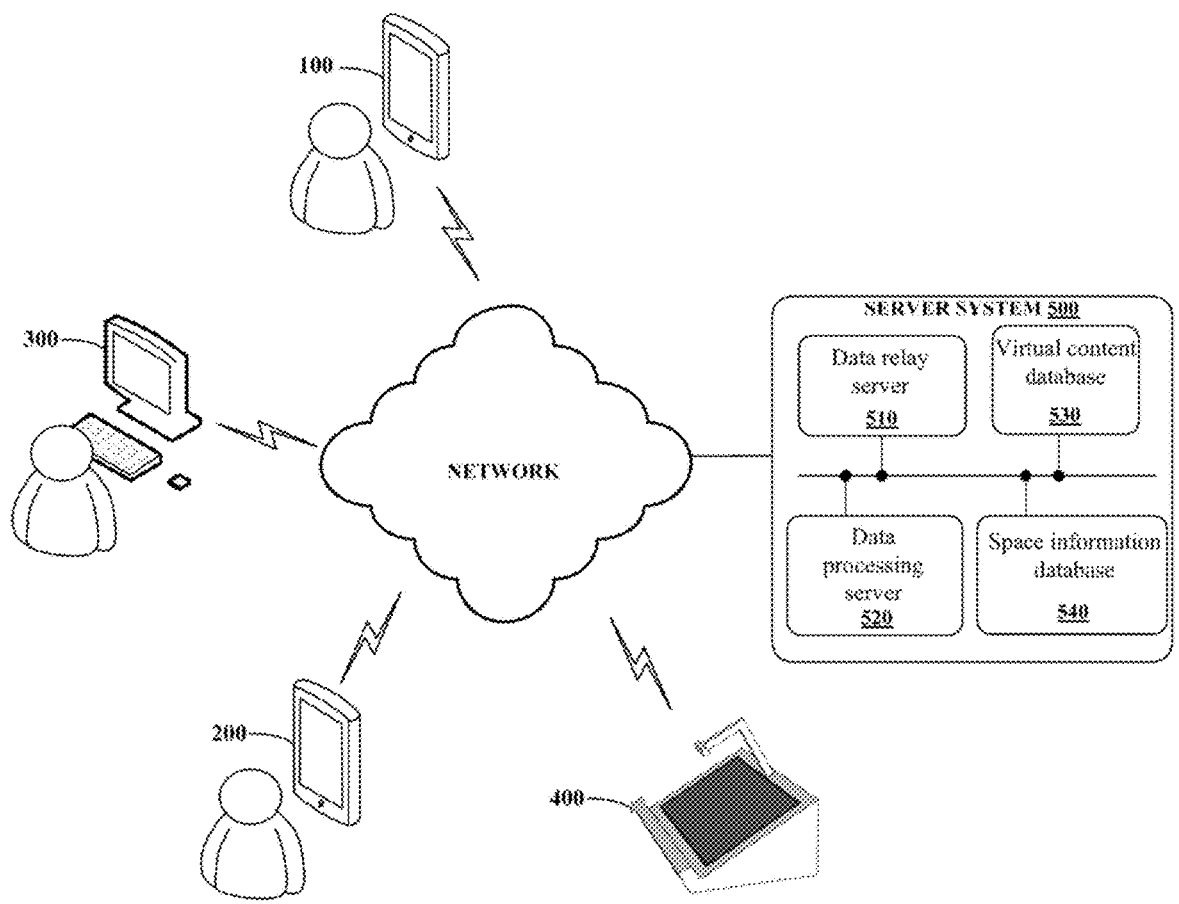

[FIG. 2]
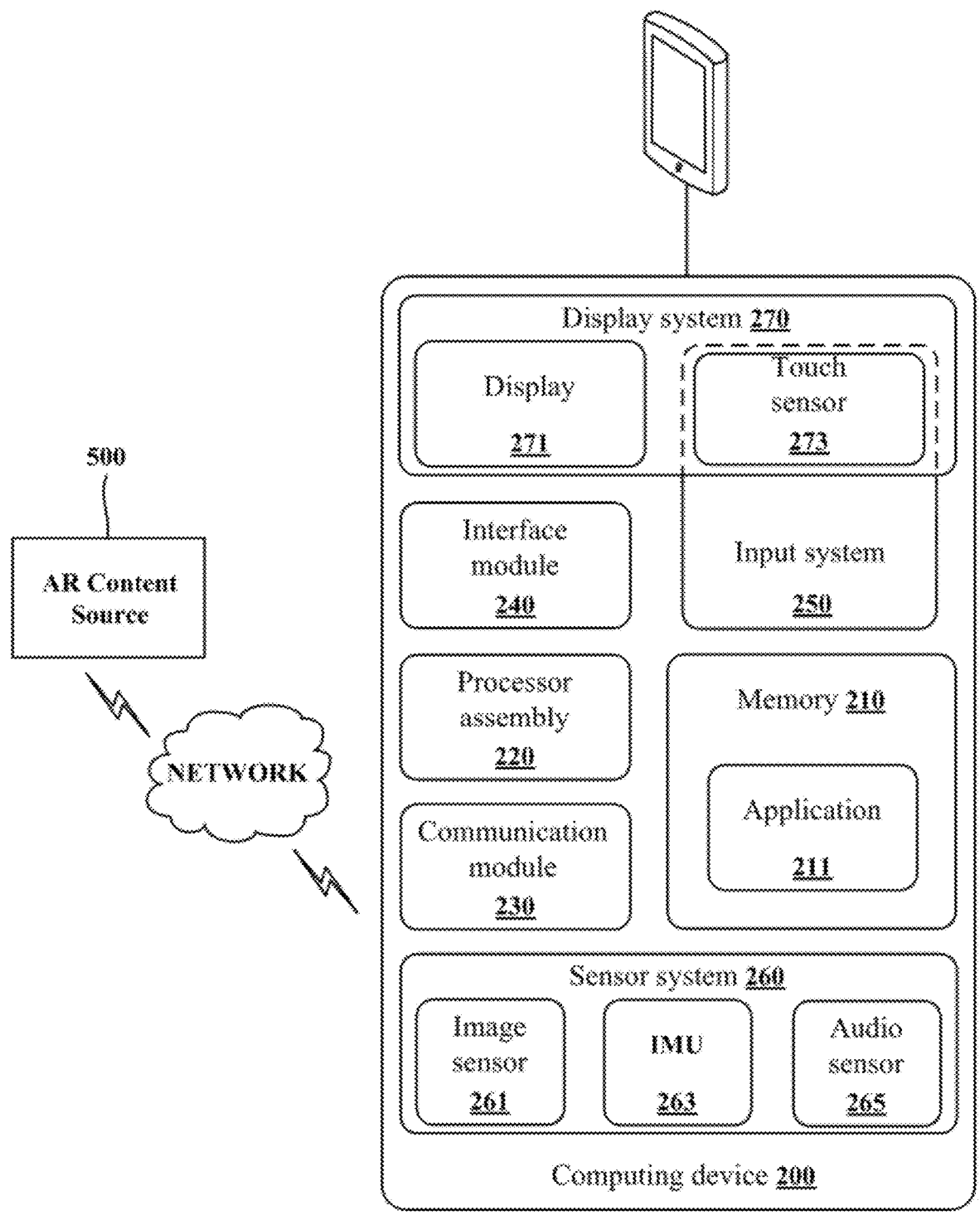

[FIG. 3]
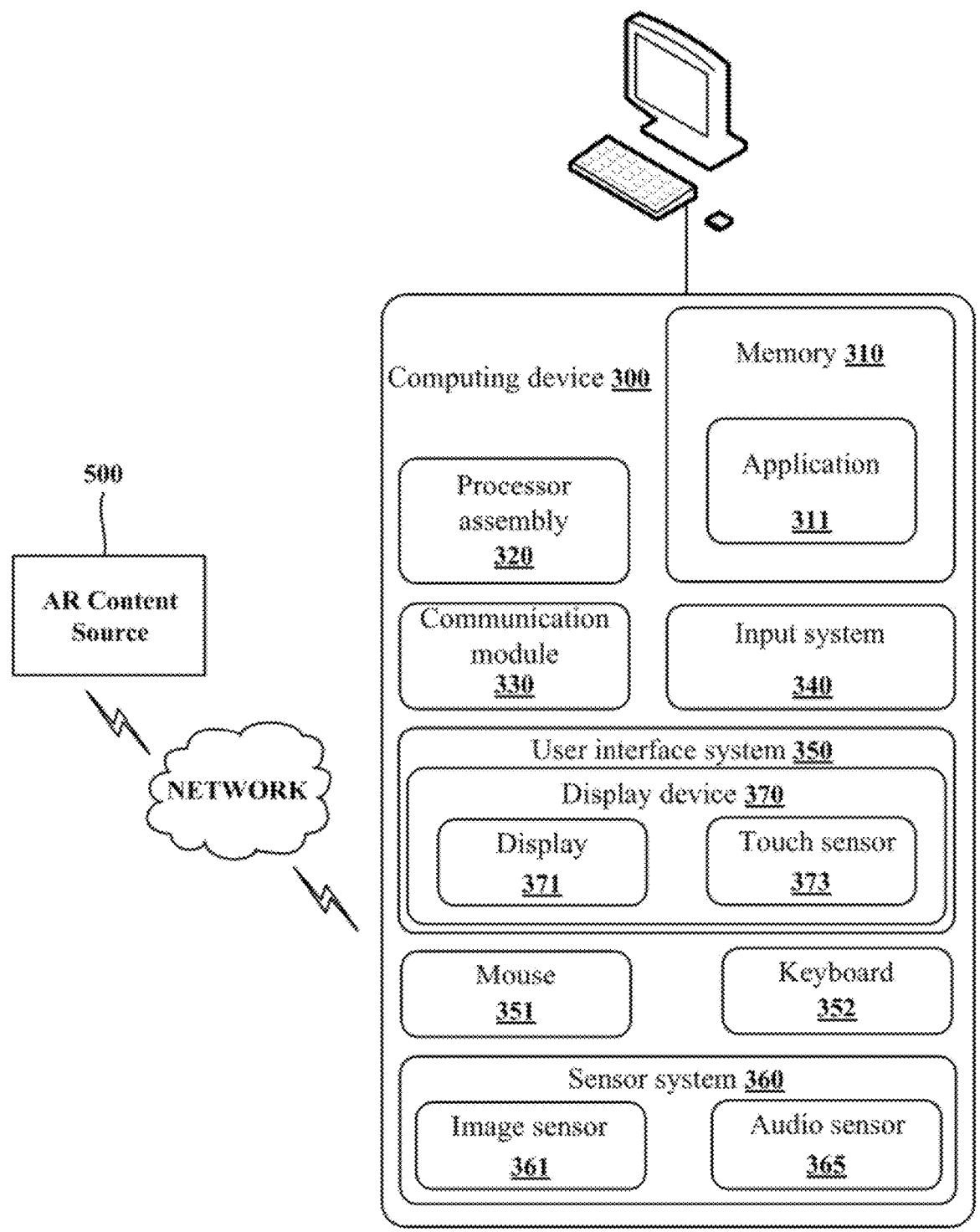

[FIG. 4]
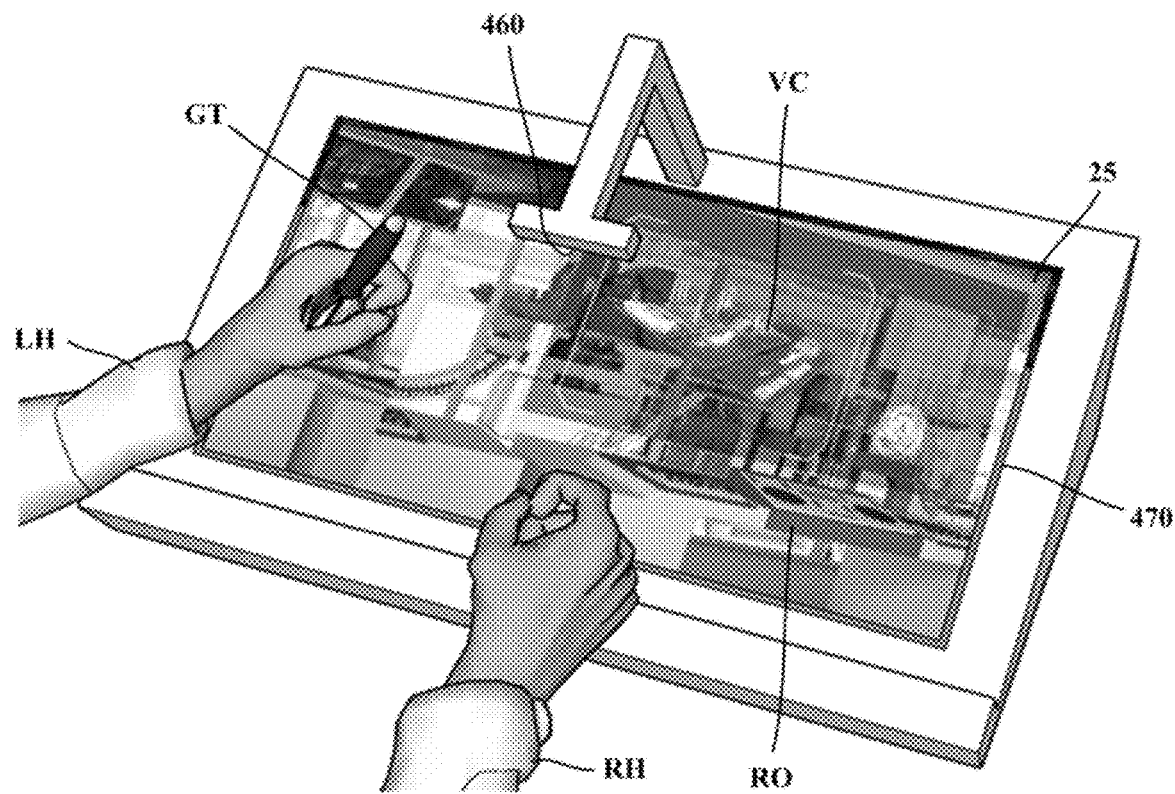

[FIG. 5]
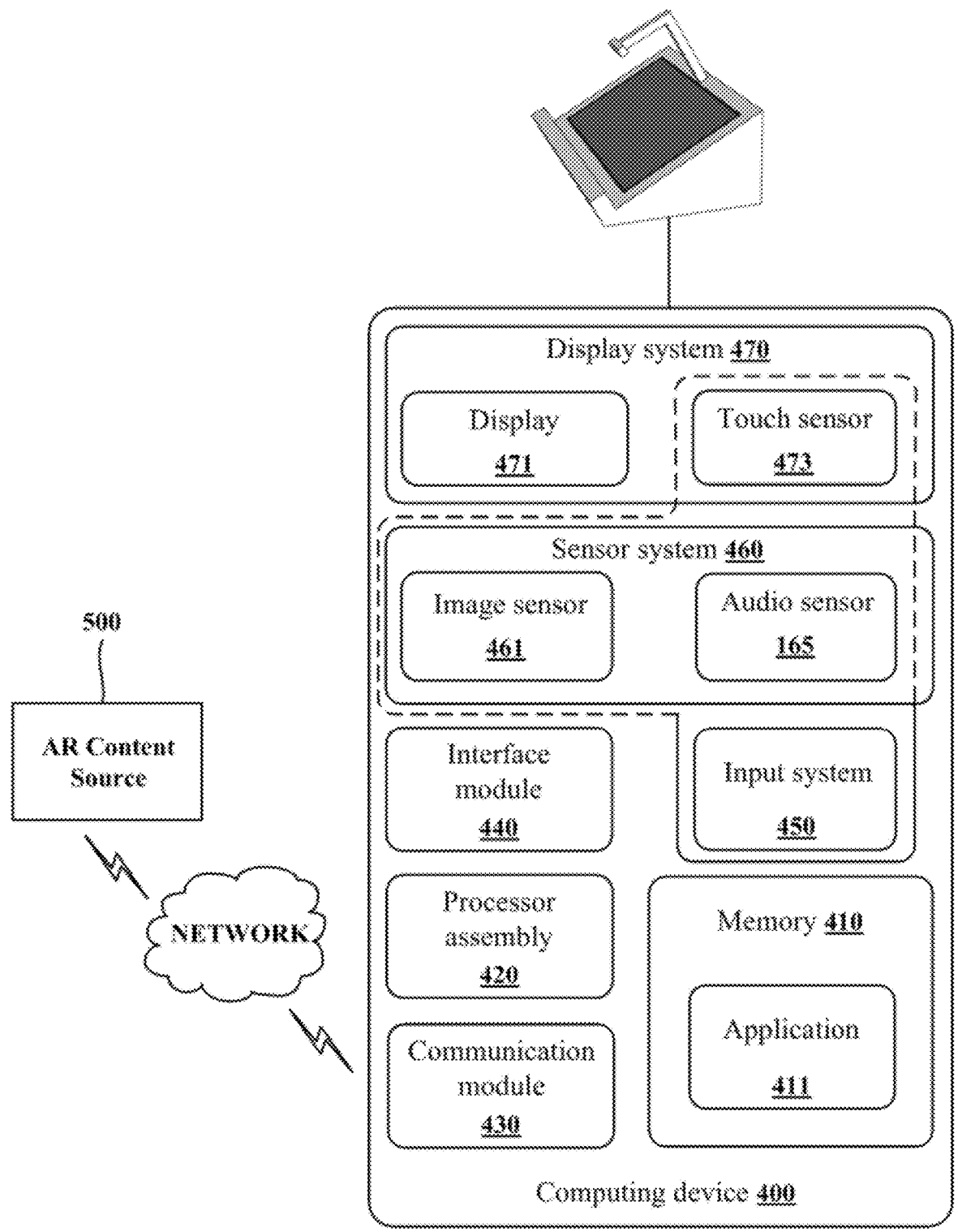

[FIG. 6]
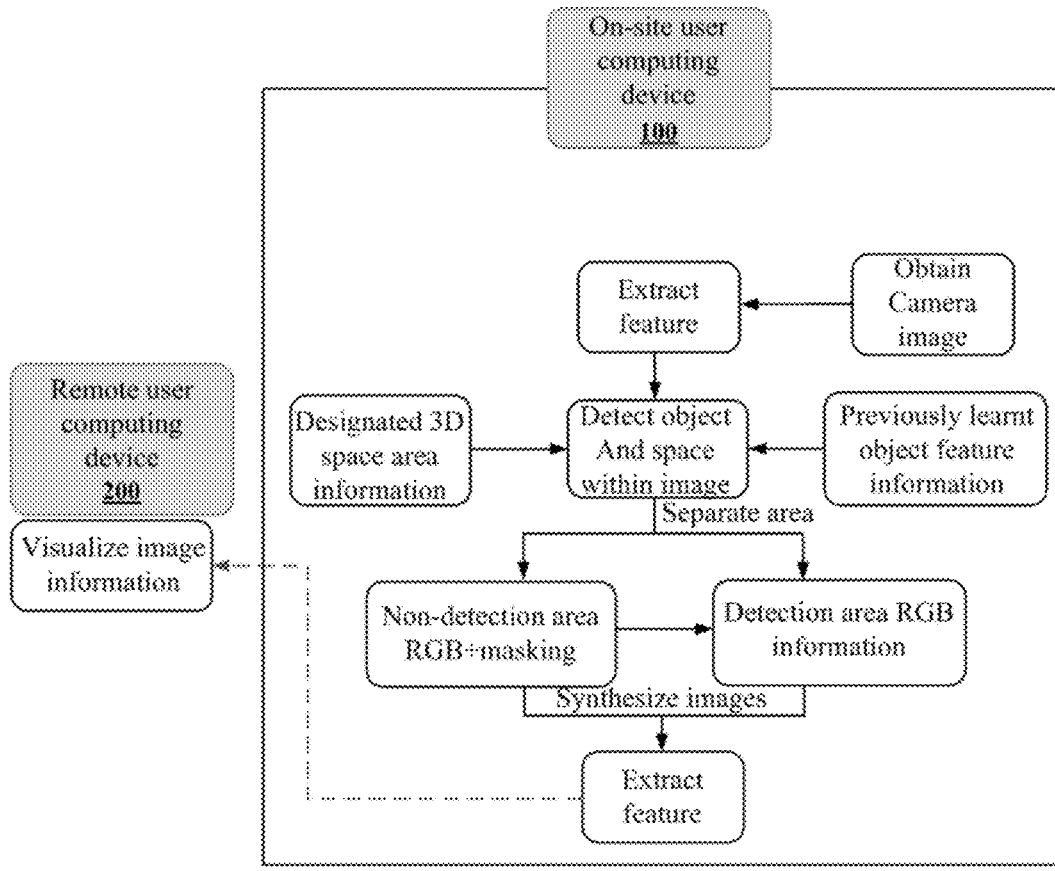
[FIG. 7]
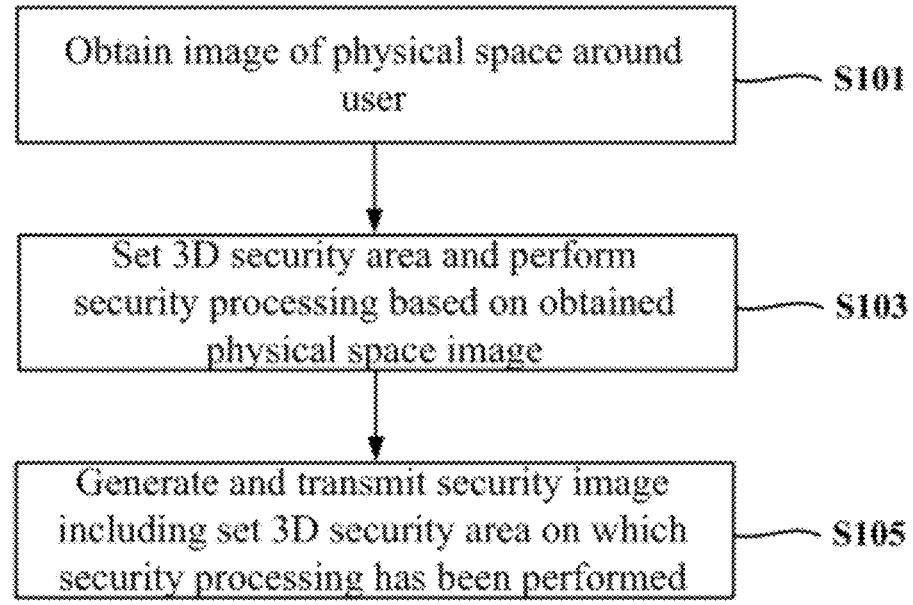

[FIG. 8]
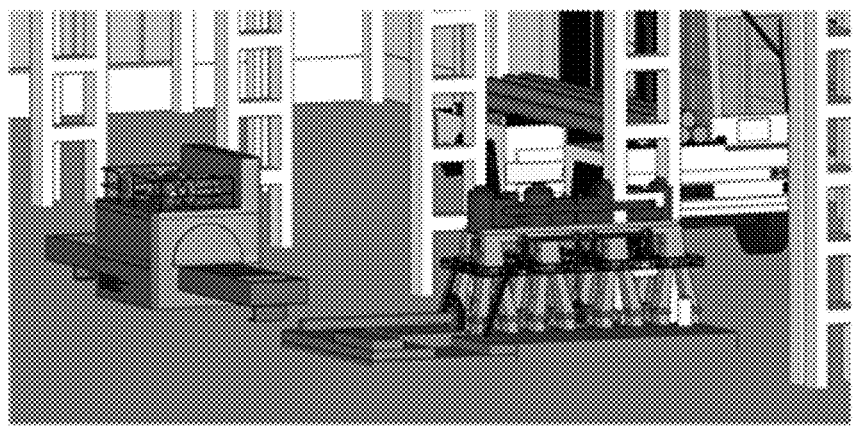
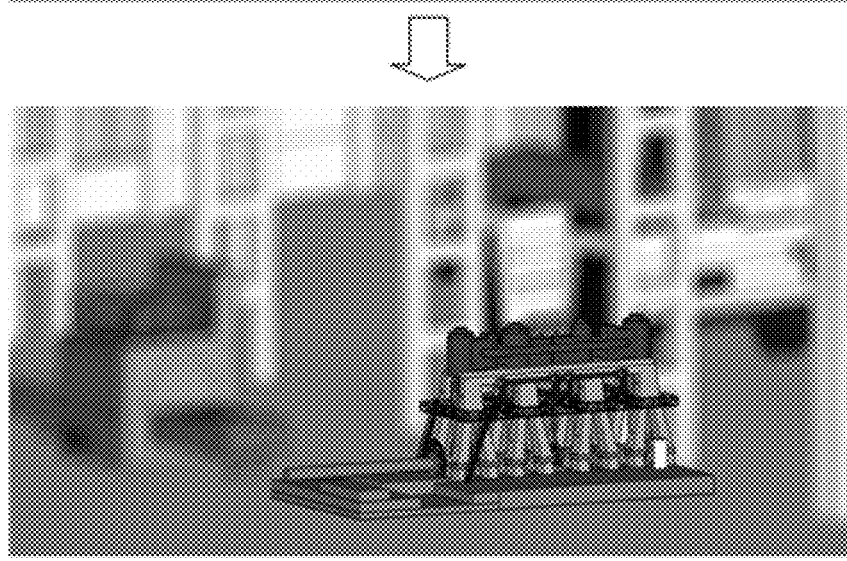
[FIG. 9]
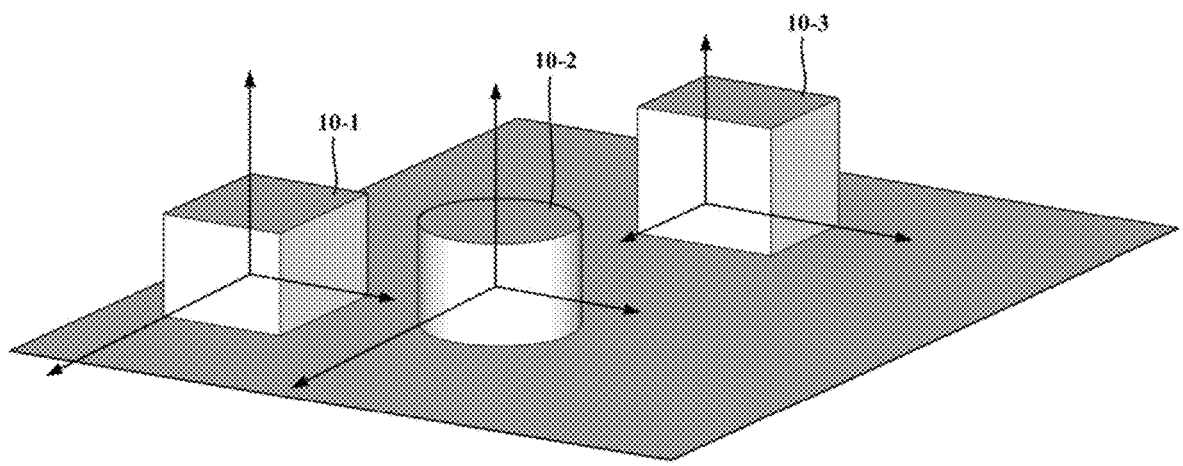

[FIG. 10]
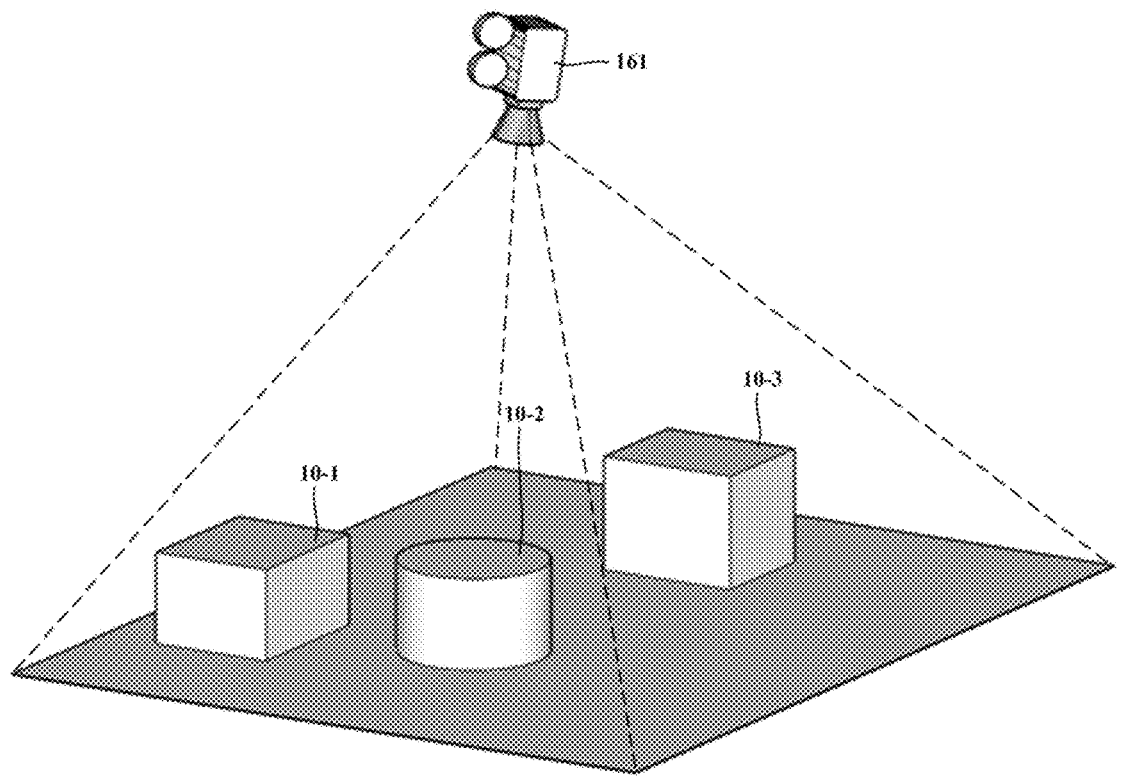
[FIG. 11]
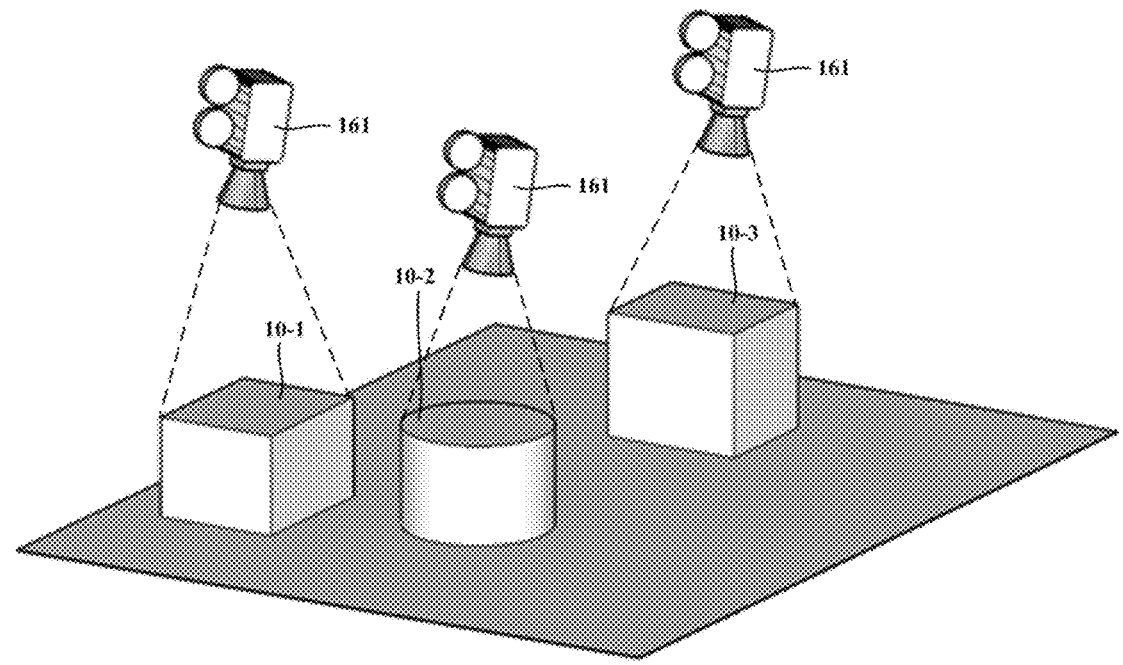

[FIG. 12]
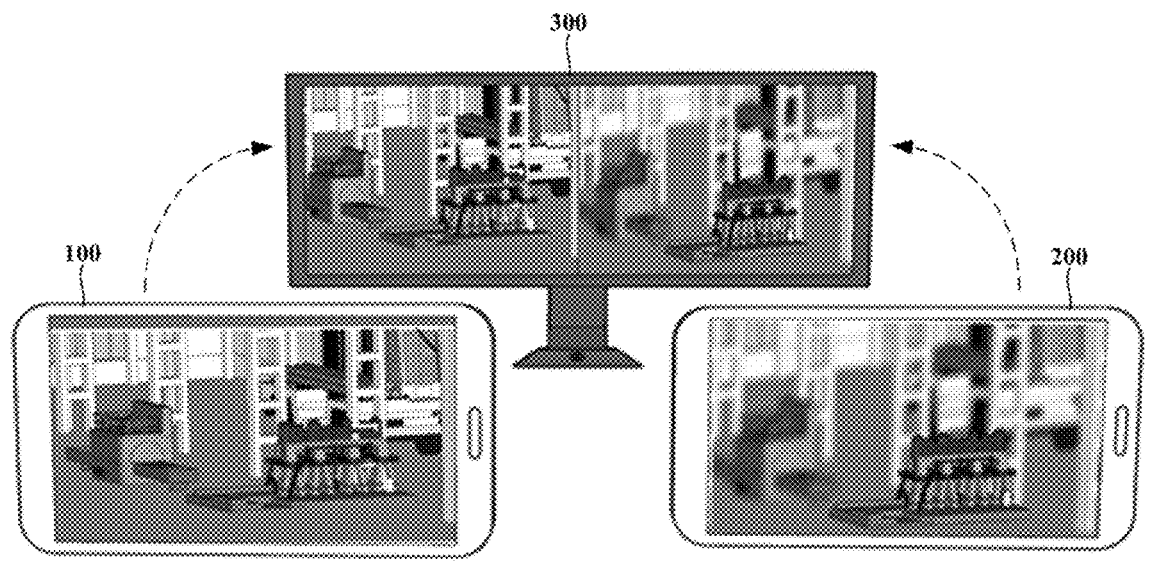
[FIG. 13]
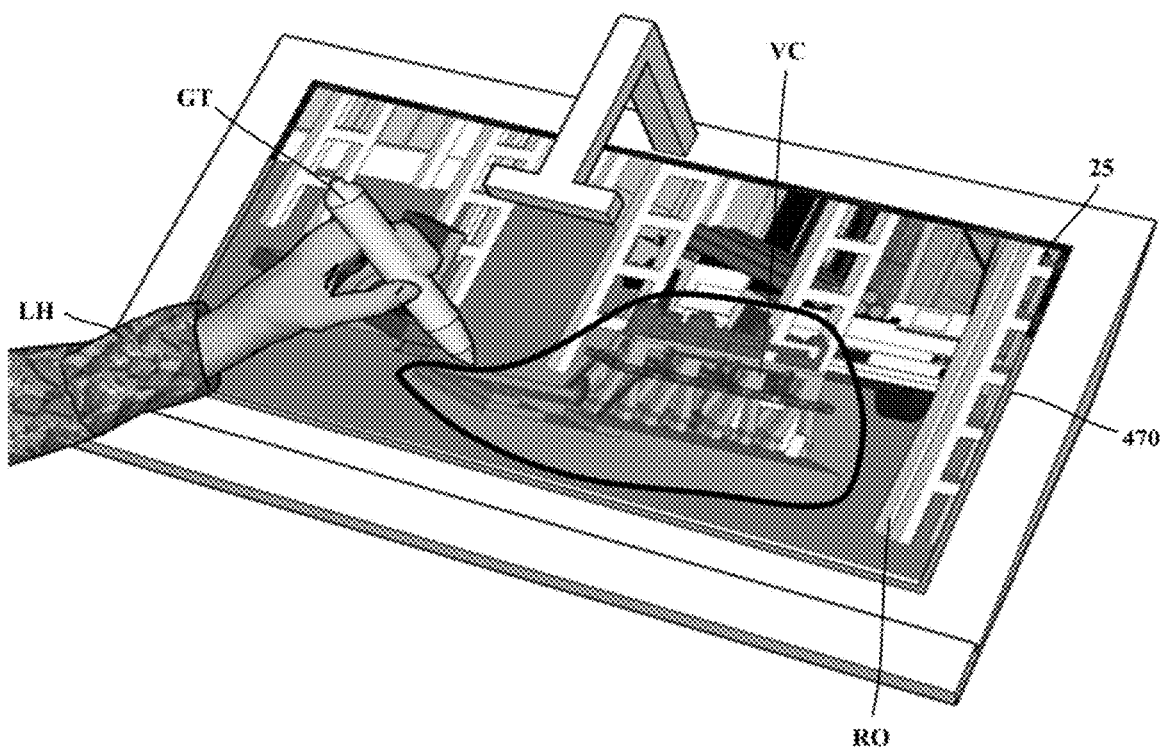

AUGMENTED REALITY REMOTE COMMUNICATION METHOD AND SYSTEM FOR PROVIDING SECURITY FUNCTION FOR 3D SPACE

CROSS-REFERENCE TO RELATED APPLICATIONS

This application claims the priority of the Korean Patent Applications NO. 10-2019-0178664 filed on Dec. 30, 2019, in the Korean Intellectual Property Office, the disclosure of which is incorporated herein by reference.

BACKGROUND OF THE DISCLOSURE

Field of the Disclosure

The present disclosure relates to an augmented reality (AR) remote communication method and system for providing a security function for a three-dimensional (3D) space and, more particularly, to an AR remote communication method and system for generating an image converted from a given area of an image of a 3D space and providing a security function for the image of the 3D space.

Related Art

In general, in most of industry fields, workers perform maintenance and tasks for various devices, equipment or apparatuses.

In general, a manual for such maintenance or a task is produced as a book or in the form of a two-dimensional (2D) image. However, the manual produced as a book has problems in that a user has to find a corresponding page for a problem (e.g., a failure in specific device) to be solved one by one and a method presented in the corresponding book may not be frequently a solution if the manual is long.

Accordingly, a task method of providing, by a manager at a remote place, an on-site worker with guidance for maintenance and a task based on remote computer control technology in which a given computer can easily control a computer at another place is recently used.

According to such remote computer control technology, a given computer can easily process information at a place independently spaced apart from a computer, that is, the subject of remote control.

However, the conventional remote computer control technology has a problem in that it may pose a threat to the security of specific information whose leakage from an industrial site to the outside is restricted because a separate security processing function is not provided to transmitted and received information.

PRIOR ART DOCUMENT

Patent Document (Patent Document 1) 10-1686926 B1

SUMMARY OF THE DISCLOSURE

The present disclosure provides a security function for protecting privacy when mutual communication is performed within an augmented reality environment.

Specifically, the present disclosure provides an augmented reality remote communication method and system for generating an image converted from a given area of an image of a 3D space transmitted or received over a network and providing a security function for the image of the 3D space.

However, technical objects to be achieved by the present disclosure and embodiments of the present disclosure are not limited to the aforementioned technical objects, and other technical objects may be present.

In an aspect, there is provided an augmented reality (AR) remote communication method and system for providing a security function for a 3D space. An AR remote communication method of providing, by a computing device, communication within an AR environment based on an image of a three-dimensional (3D) space whose given area is secured includes obtaining a physical space image of a physical space around a user, setting a 3D security area based on the obtained physical space image, performing security processing for converting the physical space image based on the set 3D security area, and providing a security image generated by performing the security processing.

In this case, setting the 3D security area based on the obtained physical space image includes obtaining 3D space information on a previously stored real object based on information on a shape of a real object detected by analyzing the physical space image, and setting the obtained 3D space information as the 3D security area.

Furthermore, setting the 3D security area based on the obtained physical space image includes detecting at least one real object within the physical space image, extracting information on a shape of the detected real object, comparing the extracted information on the shape with previously stored real object information, detecting real object information matched with the extracted information on the shape, and obtaining 3D space information on the detected real object information.

Furthermore, setting the 3D security area based on the obtained physical space image comprises providing a 3D security area designation interface in which the 3D security area is set in the physical space image.

Furthermore, the 3D security area designation interface includes at least one interface of an interface in which a real object is designated in the physical space image and an interface in which 3D model information corresponding to the real object is set and 3D space information on the real object is obtained.

Furthermore, setting the 3D security area based on the obtained physical space image includes setting, as the 3D security area, a given area matched with the 3D space information or remaining areas other than the given area, and displaying a blurred 3D security image of the 3D security area.

Furthermore, displaying the blurred 3D security image of the 3D security area includes transmitting the 3D security image to a remote user computing device, receiving virtual content of the 3D security image from the remote user computing device, and displaying an AR image obtained by overlaying the received virtual content on the 3D security image.

BRIEF DESCRIPTION OF THE DRAWINGS

FIG. 1 is a conceptual diagram of an AR remote communication method and system for providing a security function for a dimensional space according to an embodiment of the present disclosure.

FIG. 2 is an internal block diagram of a mobile type computing device according to an embodiment of the present disclosure.

FIG. 3 is an internal block diagram of a desktop type computing device according to an embodiment of the present disclosure.

FIG. 4 is a conceptual diagram illustrating the state in which a user experiences extended reality communication through a table-top type computing device according to an embodiment of the present disclosure.

FIG. 5 is an internal block diagram of the table-top type computing device according to an embodiment of the present disclosure.

FIG. 6 is a conceptual diagram for describing an AR remote communication method for providing a security function for a 3D space according to an embodiment of the present disclosure.

FIG. 7 is a flowchart for describing an AR remote communication method of providing a security function for a 3D space according to an embodiment of the present disclosure.

FIG. 8 illustrates an example in which a physical space image is subject to security processing according to an embodiment of the present disclosure.

FIG. 9 is an example in which at least one real object present in a physical space of the real world is conceptualized and illustrated according to an embodiment of the present disclosure.

FIG. 10 is a diagram for describing a method of obtaining real object information at a time according to an embodiment of the present disclosure.

FIG. 11 is a diagram for describing a method of individually obtaining real object information according to an embodiment of the present disclosure.

FIG. 12 is a conceptual diagram for describing a method of relaying, by an internal manager computing device, an on-site user computing device and a remote user computing device according to an embodiment of the present disclosure.

FIG. 13 is an example in which the internal manager computing device is implemented as a table-top type computing device and sets an additional 3D security area according to an embodiment of the present disclosure.

DESCRIPTION OF EXEMPLARY EMBODIMENTS

The present disclosure may be modified in various ways and may have various embodiments. Specific embodiments are to be illustrated in the drawings and are to be described the detailed description. The effects and characteristics of the present disclosure and a method for achieving them will become evident with reference to the embodiments described in detail along with the drawings. However, the present disclosure is not limited to the following embodiments, but may be implemented in various forms. In the following embodiments, terms, such as "a first" and "a second", are not used as limiting meanings, but are used to distinguish one component from the other component. Furthermore, an expression of the singular number includes an expression of the plural number unless clearly defined otherwise in the context. Furthermore, a term, such as "include" or "have", is intended to designate that a characteristic or component described in the specification is present, and do not exclude the possible addition of one or more other characteristics or components in advance. Furthermore, in the drawings, the size of each of components may be enlarged or reduced for convenience of description. For example, the size and thickness of each of components shown in the drawings is arbitrarily illustrated for convenience of description, and thus the present disclosure is not essentially limited thereto.

Hereinafter, embodiments of the present disclosure are described in detail with reference to the accompanying drawings. In describing the embodiments with reference to the accompanying drawings, the same component is assigned the same reference numeral, and a redundant description of the same component is omitted.

FIG. 1 is a conceptual diagram of an AR remote communication method and system for providing a security function for a dimensional space according to an embodiment of the present disclosure.

Referring to FIG. 1, an augmented reality remote communication system for providing a security function for a 3D space according to an embodiment of the present disclosure may generate a secure image of a given area of an image of a 3D space transmitted or received over a network, and may provide a security function for the corresponding image of the 3D space.

Furthermore, the augmented reality remote communication system for providing a security function for a 3D space may enable users to communicate with each other based on extended reality content through computing devices.

In this case, an extended reality environment means an environment generated by inserting associated virtual content into a physical space around a user a counterpart with which communication is to be performed, may include an augmented reality (AR) environment and a mixed reality (MR) environment. The virtual content is generated from the computing device, and includes a label, text information, an image, a drawing object, and a 3D entity. The virtual content is augmented/mixed content generated in accordance with the physical space or an image obtained by photographing the physical space.

Furthermore, extended reality (XR) communication means activities for exchanging communication data for communications between different users through computing devices based on tangible media (e.g., an image, voice) including virtual content.

That is, the communication system according to an embodiment can support multilateral communication within an XR environment by supporting communication using, as an additional medium, virtual content associated with a physical space or a captured image, in addition to voice and an image, that is, communication media for common communication.

Communication data may include voice, images and/or virtual content exchanged over a network between the computing devices of different users (e.g., a remote manager and an on-site worker). In an embodiment, communication data may be transmitted or received by a computing device and/or a server over a network.

In an embodiment, the communication system may provide an XR communication environment optimized for a communication environment by providing a different communication data communication method based on a communication environment for the computing device of a user.

Specifically, the XR communication environment is based on an XR environment generated in accordance with a physical space around a user who uses an on-site computing device. A real object, that is, the subject of communication, or a real object whose security must be maintained with respect to a counterpart may be present in the physical space around the user.

In an embodiment, the communication system may provide a security function for transmitting, to the counterpart, a secure image of an area corresponding to the real object whose security must be maintained.

Specifically, in an embodiment, the XR application of a computing device may obtain an image of a physical space around a user. Furthermore, the XR application of the computing device may set a 3D security area based on then obtained physical space image, and may perform security processing on the set 3D security area.

In this case, security processing according to an embodiment of the present disclosure may be a function for preventing the counterpart from identifying a given area set as the 3D security area in the physical space image by converting the given area.

Furthermore, the computing device may generate a security image by performing security processing on the set 3D security area, and may provide the security image.

Hereinafter, a role of a computing device is differently described depending on a subject, an environment and/or an object of the computing device used, for convenience of description.

In an embodiment, the computing device may be divided into a first user computing device and a second user computing device. More specifically, the first user computing device is a remote user computing device of a remote manager spaced apart from a workplace, and may transmit and receive data with the second user computing device over a network.

Hereinafter, in the description, an example in which the first user computing device is a remote user computing device of a task manager, which provides an XR environment based on a captured image received from an on-site user computing device of an on-site worker and generates communication data in order to transmit an intention to the on-site worker in response to a first user input within a provided XR interface environment is described.

In this case, the remote manager may be a person who provides, in the form of virtual content, task guidance that instructs or assists a task of an on-site worker at a place spaced apart from a site where a task is performed.

Furthermore, the on-site worker may be a person who performs an actual task based on an XR environment provided through task guidance received in a workplace.

In the following description, an example in which a first user is a remote manager and a second user is an on-site worker is described.

Furthermore, in FIG. 1, a computing device and a server system may be connected over a network. The network means a connection structure that enables the exchange of information between nodes, such as the computing device and the server system. Examples of the network include a $3^{rd}$ generation partnership project (3GPP) network, a long term evolution (LTE) network, a World Interoperability for Microwave Access (WiMAX) network, the Internet, a local area network (LAN), a wireless LAN (WLAN), a wide area network (WAN), a personal area network (PAN), a Bluetooth network, a satellite broadcasting network, an analog broadcasting network, and a digital multimedia broadcasting (DMB) network, but the present disclosure is not limited to.

Computing Devices 100, 200, 300, and 400

The computing device provides a user with an XR environment, and may execute an XR application for communication with another user using voice, an image and virtual content corresponding to a real object within the XR environment.

The computing device may include various types (e.g., a mobile type, a desktop type and a table-top type) of computing devices in which the XR application is installed.

1. Mobile Type Computing Device 100 or 200

FIG. 2 is an internal block diagram of the mobile type computing device according to an embodiment of the present disclosure.

For another example, the computing device 100 or 200 may be a mobile device, such as a smartphone or a tablet PC in which a 3D security processing application and/or an XR application is installed. The mobile type computing device 100 or 200 may capture an image of a surrounding physical space using an image sensor, and may provide a user with an XR environment by displaying an image captured through a display system and virtual content matched with the physical space.

For example, the computing device may include a smartphone, a mobile phone, a terminal for digital broadcasting, a personal digital assistant (PDA), a portable multimedia player (PMP), and a tablet PC.

The XR application installed in the mobile type computing device 100 or 200 may capture an image of a real object RO and a marker MK in a surrounding physical space 20, and may display the captured image by controlling a display system. Furthermore, the XR application may control virtual content VC1 to be displayed at a location corresponding to the recognized marker MK. Furthermore, the XR application may recognize a specific real object by learning the real object, and may control virtual content VC2 to be displayed at a user's gaze corresponding to the location of the recognized specific real object.

Furthermore, the 3D security processing application installed in the mobile type computing device 100 or 200 may obtain an image of a physical space around a user.

Furthermore, the computing device may set a 3D security area based on an obtained physical space image, and may perform security processing on the set 3D security area. Furthermore, the 3D security processing application may generate a security mage by performing security processing on the set 3D security area, and may provide the security image.

Referring to FIG. 2, the mobile type computing device 100 or 200 according to an exemplary implementation may include a memory 210, a processor assembly 220, a communication module 230, an interface module 240, an input system 250, a sensor system 260, and a display system 270. Such components may be configured to be included in the housing of the computing device 100 or 200.

The memory 210 stores the 3D security processing application and/or the XR application 211. The 3D security processing application and/or the XR application 111 may include virtual content, an image buffer, a position engine, and a virtual content display engine for providing an XR environment. That is, the memory 210 may store an instruction and data which may be used to generate the XR environment.

In an embodiment, the 3D security processing application and/or the XR application 111 may include various applications, engines, data and instructions for providing an AR remote communication service that provides a security function for a 3D space.

Furthermore, the memory 210 may include at least one non-transitory computer-readable storage medium and at least one transitory computer-readable storage medium. For example, the memory 210 may include various storage devices, such as a ROM, an EPROM, a flash drive, and a hard drive, and may include a web storage that performs the storage function of the memory 210 on the Internet.

In order to implement an AR remote communication service that provides a security function for a 3D space, the processor assembly 220 may include at least one processor capable of executing instructions of the 3D security processing application and/or the XR application 111 stored in the memory 210.

In an embodiment, in order to implement an AR remote communication service that provides a security function for a 3D space, the processor assembly 220 may control an overall operation of components using the 3D security processing application and/or the XR application 111 of the memory 210.

The processor assembly 220 may include a central processing unit (CPU) and/or a graphic processor unit (GPU). Furthermore, the processor assembly 220 may be implemented to include at least one of application specific integrated circuits (ASICs), digital signal processors (DSPs), digital signal processing devices (DSPDs), programmable logic devices (PLDs), field programmable gate arrays (FPGAs), controllers, micro-controllers, microprocessors, and electrical units for performing other functions.

The communication module 230 may include one or more devices for communicating with another computing device (e.g., a server system 500). The communication module 230 may perform communication over a wireless network.

In an embodiment, the communication module 230 may transmit or receive, to the server system 500 and/or another computing device 100 or 200, communication data related to an AR remote communication service that provides a security function for a 3D space.

The communication module 230 may wirelessly transmit or receive data to or from at least one of a base station, an external terminal, and a given server over a mobile communication network constructed through a communication device capable of performing technical standards for mobile communication or communication methods (e.g., long term evolution (LTE), long term evolution-advanced (LTE-A), 5G new radio (NR), and WIFI) or a short-distance communication method.

The sensor system 260 may include various sensors, such as an image sensor 261, a position sensor (IMU) 263, an audio sensor, a distance sensor, a proximity sensor, a contact sensor.

The image sensor 261 may capture an image and/or video of a physical space around the computing device 100 or 200.

In an embodiment, the image sensor 261 may obtain an image related to an AR remote communication service that provides a security function for a 3D space by capturing the image.

Furthermore, the image sensor 261 may obtain an image by photographing a direction side positioned at the front and/or rear of the computing device 100 or 200, and may photograph a physical space, such as a workplace, using a camera positioned toward the outside of the computing device 100 or 200.

The image sensor 261 may include an image processing module. Specifically, the image sensor 261 may process a still image or a moving image obtained by the image sensor 261 (e.g., a CMOS or a CCD).

Furthermore, the image sensor 261 may extract required information by processing a still image or a moving image, obtained through the image sensor 261, using the image processing module, and may transmit the extracted information to a processor.

The image sensor 261 may be a camera assembly including at least one camera. The camera assembly may include a common camera for photographing a visible-ray band, and may further include a special camera, such as an infrared camera or a stereo camera.

The IMU 263 may detect at least one of a motion and acceleration of the computing device 100 or 200. For example, the IMU may be composed of a combination of various position sensors, such as an accelerometer, a gyroscope, and a magnetometer. Furthermore, the IMU may recognize space information on a physical space around the computing device 100 or 200 while operating in conjunction with the communication module 230, such as the GPSs of the communication module 230.

Furthermore, the IMU 263 may detect information that detects and tracks a gaze direction and head motion of a user based on a detected position and direction.

Furthermore, in some implementations, the 3D security processing application and/or the XR application 111 may determine a position and direction of a user within a physical space using the IMU 263 and the image sensor 261 or may recognize a characteristic or an object within a physical space.

The audio sensor 265 may recognize a sound around the computing device 100 or 200.

Specifically, the audio sensor 265 may include a microphone capable of detecting a voice input from the user of the computing device 100 or 200.

In an embodiment, the audio sensor 265 may receive, from a user, voice data for communication data which may be transmitted through an AR remote communication service that provides a security function for a 3D space.

The interface module 240 may connect the computing device 100 or 200 in a way to communicate with one or more other devices. Specifically, the interface module 240 may include wired and/or wireless communication devices compatible with one or more different communication protocols.

The computing device 100 or 200 may be connected to several input and output devices through the interface module 240.

For example, the interface module 240 is connected to an audio output device, such as a headset port or a speaker, and may output an audio.

Illustratively, the audio output device has been illustrated as being connected to the interface module 240, but the present disclosure may include an embodiment in which the audio output device is installed within the computing device 100 or 200.

The interface module 240 may be configured to include at least one of a wired/wireless headset port, an external charger port, a wired/wireless data port, a memory card port, a port that connects a device equipped with an identification module, an audio input/output (I/O) port, a video input/output (I/O) port, an earphone port, a power amplifier, an RF circuit, a transmitter or a receiver, and other communication circuits.

The input system 250 may detect an input (e.g., a gesture, a voice instruction, an operation of a button or another type of input) from a user, which is related to an AR remote communication service that provides a security function for a 3D space.

Specifically, the input system 250 may include a button, a touch sensor and the image sensor 261 for receiving a user motion input.

Furthermore, the input system 250 is connected to an external controller through the interface module 240, and may receive an input from a user.

The display system 270 may output, in the form of a graphic image, various types of information related to an AR remote communication service that provides a security function for a 3D space.

Such a display system may include at least one of a liquid crystal display (LCD), a thin film transistor-liquid crystal display (TFT LCD), an organic light-emitting diode (OLED), a flexible display, a 3D display, and an e-ink display.

The components may be disposed within the housing of the mobile type computing device 100 or 200. A user interface may include a touch sensor 273 on a display 271 configured to receive a user touch input.

Specifically, the display system 270 may include the display 271 for displaying an image and the touch sensor 273 for detecting a touch input from a user.

Illustratively, the display 271 may be implemented as a touch screen by forming or being integrated with a mutual layer structure with the touch sensor 273. The touch screen functions as a user input unit that provides an input interface between the computing device 100 or 200 and a user, and may provide an output interface between the computing device 100 or 200 and a user.

Furthermore, the sensor system 260 includes the image sensor 261. Illustratively, the image sensor 261 may be disposed on one side and on the other side of the housing of the computing device 100 or 200.

In this case, the image sensor on one side may be directed toward a physical space, and may capture an image of the physical space. The image sensor on the other side may be directed toward the user side, and may photograph a user gaze, a gesture, etc.

The mobile type computing device 100 or 200 may be suitable for an on-site worker positioned in a physical space, such as a workplace.

2. Desktop Type Computing Device 300

FIG. 3 is an internal block diagram of a desktop type computing device according to an embodiment of the present disclosure.

Contents redundant with the description of the components of the desktop type computing device will be substituted with the contents described in connection with the components of the mobile type computing device 100 or 200. Hereafter, a difference between the desktop type computing device 300 and the mobile type computing device 100 or 200 is chiefly described.

Referring to FIG. 3, for another example, the computing device 300 may further include a device in which a program for executing a network speed response type XR (XR) communication service based on wired/wireless communication is installed, such as a personal computer, including a stationary desktop PC, a laptop computer, and an ultrabook in which a 3D security processing application and/or an XR application 311 is installed.

The desktop type computing device 300 may receive an image of a surrounding physical space photographed by the computing device 300 of another user, and may provide a user with an XR environment by augmenting and displaying virtual content matched with the received image and the physical space.

Furthermore, the desktop type computing device 300 includes a user interface system 350, and may receive a user input (e.g., a touch input, a mouse input, a keyboard input, a gesture input, or a motion input using a guide tool).

Illustratively, the computing device 300 may connect the user interface system 350 to at least one device of a mouse 351, a keyboard 352, a gesture input controller, an image sensor 361 (e.g., camera), and an audio sensor 365 through various communication protocols, and may obtain a user input.

Furthermore, the desktop type computing device 300 may be connected to an external output device through the user interface system 350, and may be connected to a display unit 370 and an audio output device, for example.

As an illustrative implementation, the 3D security processing application and/or the XR application 311 of the desktop computing device 300 may obtain an image of the computing device 300 of another user through the display unit 370, may output the image, may receive a user input corresponding the image, and may generate virtual content corresponding to the image based on a received user input.

Furthermore, the 3D security processing application and/or the XR application 311 may receive data from a virtual content source matched with a sensor system 360 within a physical space in an image, and may generate the received data as virtual content matched with the image.

Furthermore, the 3D security processing application and/or the XR application 311 may provide the user with an XR environment by overlaying the virtual content, generated as described above, on an image output by a display device.

Furthermore, the 3D security processing application and/or the XR application 311 may use, as a medium for communication, virtual content corresponding to a physical space along with voice and an image by transmitting, as communication data, virtual content generated through the communication module 330.

The desktop type computing device 300 according to an exemplary implementation may include a memory 310, a processor assembly 320, a communication module 330, the user interface system 350, and an input system 340. Such components may be configured to be included in the housing of the computing device 300.

Contents redundant with the description of the components of the desktop type computing device 300 will be substituted with the contents described in connection with the components of the mobile type computing device 100 or 200.

The desktop type computing device 300 may be advantageously used by a remote manager who remotely transmits an instruction or required information while operating in conjunction with the computing device 100 or 200 of an on-site worker.

3. Table-Top Type Computing Device 400

According to an illustrative implementation, the table-top type computing device 400 may be implemented in a table-top shape having a new shape and structure different from the existing desktop type computing device 300. In such a case, implementation, the table-top type computing device 400 may provide an XR environment through a system included within the table top.

Contents redundant with the description of the components of the table-top type computing device 400 will be substituted with the contents described in relation to the components of the desktop type computing device 300. Hereinafter, a difference between the table-top type computing device 400 and the desktop type computing device 300 is chiefly described.

FIG. 4 is a conceptual diagram illustrating the state in which a user experiences XR communication through the table-top type computing device according to an embodiment of the present disclosure. FIG. 5 is an internal block diagram of the table-top type computing device according to an embodiment of the present disclosure.

The table-top type computing device 400 may be a device providing an interface system which enables a remote manager to easily check an image received from the computing device of an on-site worker and smoothly inputs task guidance for an object displayed in a corresponding image based on virtual content.

That is, the table-top type computing device 400 may be a system for generating and providing an augmented/mixed reality image that displays virtual content, generated based on a real object on an image obtained at a current position, on an image obtained from the computing device of another user.

Referring to FIGS. 4 and 5, the illustrative table-top type computing device 400는, the memory 410, the processor assembly 420, the communication module 430, the interface module 440, the input system 450, the sensor system 460 and the display system 470을 may include.

Such components may be configured to be included within the housing of the computing device 400. Contents redundant with the description of the components of the table-top type computing device 400 will be substituted with the contents described in relation to the aforementioned components. Hereafter, a difference between the computing device 400 and the aforementioned computing device is chiefly described.

Referring to FIG. 4, the table-top type computing device 400 may provide a user with an XR environment by displaying, on a display system 470, an image captured by another computing device and virtual content associated with the captured image.

Furthermore, the table-top type computing device 400 may provide an input and output interface for receiving a touch input, such as a user's pointing or drag, for the captured image through a touch sensor 473 in the display 471 of the display system 470.

Furthermore, the table-top type computing device 400 may receive a gesture input through a hand (LH, RH) of a user through a sensor system 460 (e.g., an image sensor 461) positioned in the display system 470, and may receive an operation input according to a guide tool GT. Such a gesture input and operation input using the guide tool may be input in accordance with an image captured by the display 471. The computing device 300 may detect a user input through matching with a real object image displayed in the captured image.

That is, the XR application 411 of the table-top type computing device 400 according to an embodiment may execute a series of processes for implementing a service for visualizing and providing virtual content based on a user input obtained through the sensor system 460. In this case, the user input is performed in accordance with the captured image displayed on the display.

Accordingly, the user can more intuitively perform a user input to the captured image by providing an input and output interface together.

Server System 500

In an embodiment, the server system 500 may perform a series of processes for providing an AR remote communication service that provides a security function for a 3D space.

Specifically, the server system 500 may previously store real object information on at least one real object present in a physical space of the real world.

In this case, the real object information may be information, including feature information and 3D space information on a real object actually present in the real world.

In this case, the feature information may be information, including information (e.g., appearance information and/or size information) on a shape of a real object, an object name for identifying an object and/or detail information (e.g., information on an operation function performed in the real object).

Furthermore, the 3D space information may be information, including coordinate value (position) information and/or direction information of a real object in a 3D space.

Furthermore, the server system 500 may relay the exchange of communication data transmitted and received over a network between user computing devices and a communication relay.

The server system 500 may include a data relay server 510, a data processing server 520, a virtual content database 530, and a space information database 540.

Specifically, the data relay server may include communication equipment for data relay, and may relay communication data between computing devices so that the communication data is transmitted and received over a wired/wireless communication network. For example, the data relay server may perform a role of a relay that provides communication data transmitted and received between a first user computing device and a second user computing device based on a network communication speed.

Furthermore, the data processing server may perform a role of differently processing communication data depending on a network speed. Hereinafter, in an embodiment, the role of processing communication data according to a communication mode based on a network speed is described as being performed in the computing device.

Furthermore, the virtual content database may store virtual content data for implementing an AR environment or a mixed reality environment. The virtual content database may match the virtual content with a real object (e.g., marker) or space coordinates and store the matched virtual content as virtual content.

Furthermore, the virtual content database may play a role as a virtual content source that transmits virtual content matched with a surrounding physical space of the computing device in response to a request from the computing device.

Furthermore, the space information database may scan a physical space of a specific area or perform 3D space modeling on information on the physical space, and may store the results. Furthermore, the space information database may further store feature information obtained by learning an image of a real object or a marker within a physical space. The feature information may be matched with the space information and stored.

That is, the server system 500 may provide an AR environment or an XR environment through the computing device by transmitting virtual content data and space information data for a surrounding physical space of the computing device.

The server system 500 may be configured as at least one computing server or a database server, and may include processors for data processing and memories for storing instructions for providing a communication relay service.

Remote Communication Method of Providing Security Function for 3D Space

Hereinafter, a method of providing an AR remote communication service that provides a security function for a 3D space in an on-site user computing device is described in detail with reference to the accompanying drawings.

FIG. 6 is a conceptual diagram for describing an AR remote communication method of providing a security function for a 3D space according to an embodiment of the present disclosure. FIG. 7 is a flowchart for describing the AR remote communication method of providing a security function for a 3D space according to an embodiment of the present disclosure.

Referring to FIGS. 6 and 7, the XR application of the on-site user computing device 100 (hereinafter referred to as the "XR application") according to an embodiment of the present disclosure may obtain an image of a physical space around the on-site user computing device (S101).

Specifically, the XR application may obtain a physical space image of a physical space around the on-site user computing device 100 capable of setting a 3D security area, that is, an area on which security processing will be performed using the image sensor (camera).

FIG. 8 illustrates an example in which a physical space image is subject to security processing according to an embodiment of the present disclosure.

In this case, referring to FIG. 8, in an embodiment of the present disclosure, security processing may be a function for preventing a given area, set as a 3D security area in a physical space image, from being identified by converting the given area and displaying the given area differently from the existing method.

For example, the XR application may perform security processing that implements masking processing (e.g., blurring, mosaic and/or encryption processing) for a designed 3D security area.

For example, in order to obtain the physical space image, the XR application may perform cross-section photographing on a 3D security area on which security processing will be performed by 360 degrees continuously or at one timing, and thus may thus obtain the physical space image.

Furthermore, the XR application may set a 3D security area on which security processing will be performed based on the obtained physical space image, and may perform security processing on the set 3D security area (S103).

Specifically, in an embodiment, the XR application may previously store at least one piece of real object information in a database (e.g., the memory of the computing device and/or an external server).

FIG. 9 is an example in which at least one real object present in a physical space of the real world is conceptualized and illustrated according to an embodiment of the present disclosure.

Referring to FIG. 9, real object information according to an embodiment of the present disclosure may be information, including feature information and 3D space information on a real object actually present in the real world.

In this case, the feature information may be information, including information (e.g., appearance information and/or size information) on a shape of a real object, an object name for identifying the object and/or detail information (e.g., information on an operation function performed in the real object).

Furthermore, the 3D space information may be information, including coordinate value (position) information and/or direction information of a real object in a 3D space.

That is, in an embodiment, the XR application may previously store real object information in a database as described above.

In this case, the XR application may obtain and store real object information on at least one real object at a time, and may individually obtain and store real object information on a specific real object.

FIG. 10 is a diagram for describing a method of obtaining real object information at a time according to an embodiment of the present disclosure.

Specifically, referring to FIG. 10, the XR application may obtain and store real object information on one or more real objects 10-1, 10-2, 10-3, . . . at a time.

Specifically, the XR application may obtain scan information by sensing a physical space, including a plurality of real objects 10-1, 10-2, 10-3, . . . , using the image sensor.

Furthermore, the XR application may perform space learning on the plurality of real objects 10-1, 10-2, 10-3, . . . based on the obtained scan information.

In an embodiment, the XR application may perform image deep learning, while operating in conjunction with a deep learning neural network, in order to perform the space learning.

For example, the deep learning neural network operating in conjunction with the XR application may be at least one of a convolution neural network (CNN), regions with CNN features (R-CNN), Fast R-CNN, Faster R-CNN, and Mask R-CNN.

Furthermore, the XR application may obtain feature information and 3D space information on the plurality of real objects 10-1, 10-2, 10-3, . . . as the results of the execution of the image deep learning, and may store the feature information and the 3D space information in the database.

For example, the XR application may recognize a physical space of the real world, which is occupied by the plurality of real objects 10-1, 10-2, 10-3, . . . , by performing image deep learning based on the obtained scan information. Furthermore, the XR application may separate the plurality of real objects 10-1, 10-2, 10-3, . . . within the recognized physical space from a foreground using a classification model based on image deep learning, and may obtain feature information and 3D space information on the plurality of separated real objects 10-1, 10-2, 10-3, . . . at a time. Furthermore, the XR application may generate real object information on the plurality of real objects 10-1, 10-2, 10-3, . . . at a time based on the obtained feature information and 3D space information, and may store the real object information.

FIG. 11 is a diagram for describing a method of individually obtaining real object information according to an embodiment of the present disclosure.

Meanwhile, referring to FIG. 11, the XR application may individually obtain and previously store real object information on a specific real object. For example, the XR application may previously store information on a first real object 10-1.

Specifically, the XR application may first obtain scan information by sensing the first real object 10-1 using the image sensor.

Furthermore, the XR application may perform space learning on the first real object 10-1 based on the obtained scan information.

In an embodiment, the XR application may perform image deep learning while operating in conjunction with a deep learning neural network in order to perform space learning.

Furthermore, the XR application may obtain feature information and 3D space information on the first real object 10-1 as the results of the execution of the image deep learning, and may store the feature information and 3D space information in the database.

For example, the XR application may identify the first real object 10-1, different from the foreground, by performing image deep learning based on the obtained scan information. Furthermore, the XR application may obtain feature information and 3D space information on the first real object 10-1 by recognizing a physical space for the identified first real object 10-1. Furthermore, the XR application may generate and store real object information on the first real object 10-1 based on the obtained feature information and 3D space information.

As described above, the XR application may obtain real object information on the plurality of real objects 10-1, 10-2, 10-3, . . . at a time in order to promote a rapid database construction, and may specify a specific real object and obtain real object information in order to promote a more accurate database construction.

Furthermore, the XR application according to an embodiment of the present disclosure performs previous learning on one or more real object 10-1, 10-2, 10-3, . . . and stores and manages information on the real object 10-1, 10-2, 10-3, . . . as described above. Accordingly, a real object, that is, a target for setting a 3D security area in a physical space, can be subsequently detected more rapidly and conveniently, and security processing can be performed.

The XR application according to an embodiment of the present disclosure may read any one of the one or more pieces of real object information, stored in the database as described above, based on the physical space image obtained using the image sensor.

Specifically, the XR application may determine a real object whose 3D security area is to be set based on the obtained physical space image.

In an embodiment, the XR application may determine a real object whose 3D security area is to be set based on a selection input from a user or based on a preset criterion.

For example, the XR application may detect an object that occupies the greatest area by performing image deep learning on a physical space image, and may designate a real object according to a preset criterion for determining the detected object as a real object whose 3D security area is to be set.

Furthermore, the XR application may derive information (e.g., appearance information and/or size information) on a shape of the determined real object.

In an embodiment, the XR application may obtain information on a shape of the determined real object based on image deep learning using a deep learning neural network.

Furthermore, the XR application may detect actual object information included in the feature information of the shape information by comparing the obtained information on the shape with information on at least one real object previously stored in the database.

In this case, when real object information having the information on the shape identical with the obtained information on the shape is present, the XR application may extract 3D space information matched with the detected real object information.

Furthermore, the XR application may set, as a 3D security area, a given area matched with the 3D space information in a corresponding physical space image based on the extracted 3D space information and perform security processing on the 3D security area, or may set, as a 3D security area, the remaining areas other than a given area matched with the 3D space information and perform security processing on the 3D security area.

For example, if the remaining areas other than a given area matched with 3D space information is set as a 3D security area and security processing is performed on the 3D security area, the XR application may first separate an image area matched with the given area from a physical space image, and may set the remaining areas of the physical space image as the 3D security area. Furthermore, the XR application may perform masking processing (e.g., blurring, mosaic and/or encryption processing) on an image of a portion set as the 3D security area, and may perform security processing on images of the remaining portions without any change.

As described above, the XR application performs security processing on at least one real object in a physical space image based on real object information previously learnt and stored in the database. Accordingly, security processing for an image of a 3D space including specific information whose leakage to the outside is restricted can be performed more rapidly and conveniently.

In another embodiment, although real object information previously stored in the database is not present, the XR application may set a 3D security area on which security processing will be performed based on an obtained physical space image, and may perform security processing on the set 3D security area.

Specifically, the XR application may first perform space learning on a corresponding physical space based on the obtained physical space image.

For example, the XR application may perform space learning on the obtained physical space image using a simultaneous localization and mapping (Slam) system.

Furthermore, the XR application may provide a 3D security area designation interface in which a 3D security area may be set within a learnt physical space.

In an embodiment, the XR application may provide an interface in which a real object whose 3D security area will be set and/or an interface in which 3D model information will be set in accordance with a real object whose 3D security area will be set, through the 3D security area designation interface.

In this case, the 3D model information may be feature information (in particular, appearance information) of the real object whose 3D security area will be set and information on a virtual object generated in a shape matched with 3D space information. That is, the 3D model information may include appearance information and 3D space information on the virtual object, which are generated based on real object information of the real object whose 3D security area will be set.

More specifically, the XR application may determine a 3D model, that is, a virtual object corresponding to a space shape whose 3D security area will be set.

For example, if a space shape (real object) whose 3D security area will be set is a rectangular box shape, the XR application may determine a 3D model as a hexahedron. For another example, if a space shape (real object) whose 3D security area will be set is a cylindrical shape, the XR application may determine a 3D model as a cylinder.

Furthermore, the XR application may overlap and display the determined 3D model on a physical space image.

Furthermore, the XR application may provide a 3D model setting interface in which manual setting may be performed on the displayed 3D model.

Specifically, the XR application may provide a 3D model setting interface in which detailed shape setting may be performed on the displayed 3D model so that the displayed 3D model is implemented in a shape matched with the real object whose 3D security area will be set as much as possible.

In an embodiment, the XR application may perform setting on appearance information and/or 3D space information on a 3D model displayed in a physical space image, based on a user input based on the 3D model setting interface.

For example, the XR application may designate at least one point (or vertex) of the 3D model based on the user input based on the 3D model setting interface. For another example, the XR application may provide a Gizmos interface through the 3D model setting interface so that position attributes and/or direction attributes of the 3D model can be changed, and may set appearance information and/or 3D space information on the 3D model based on the changed position attributes and/or direction attributes.

Furthermore, the XR application may determine a 3D space, corresponding to the set 3D model in a physical space image, based on the set 3D model through the 3D model setting interface, and may generate 3D model information on the set 3D model.

Thereafter, the XR application may set, as a 3D security area, a given are matched with 3D space information of the 3D model information in the physical space image based on the generated 3D model information and perform security processing on the 3D security area, or may set, as a 3D security area, the remaining areas other than a given area matched with the 3D space information and perform security processing on the 3D security area.

For example, if the remaining areas other than the given area matched with the 3D space information are set as a 3D security area and security processing is performed on the 3D security area, the XR application may first separate the given area and the remaining areas, and may set the remaining areas as the 3D security area. Furthermore, the XR application may perform masking processing (e.g., blurring, mosaic and/or encryption processing) on an image of a portion set as the 3D security area, and may perform security processing on images of the remaining portions without any change.

As described above, the XR application according to an embodiment of the present disclosure performs security processing based on a user input based on the 3D security area designation interface including the 3D model setting interface. Accordingly, a 3D security area can be flexibly changed as a user wants according to circumstances, and security processing can be implemented based on the changed 3D security area.

Furthermore, the XR application according to an embodiment of the present disclosure may generate a security image including the set 3D security area on which security processing has been performed, and may transmit the security image (S105).

Specifically, the XR application may set a 3D security area in a physical space image obtained using the image sensor, may generate a security image, that is, an image on which security processing has been performed, and may transmit the generated security image to the remote user computing device 200.

That is, the XR application generates the security image on which security processing has been performed by converting a given area in a physical space image, and provides the security image to the remote user computing device 200. Accordingly, the security of an image of a 3D space including specific information whose leakage to the outside is restricted can be enhanced.

In this case, according to an embodiment, the XR application may transmit the generated security image to the remote user computing device 200 via the internal manager computing device 300.

FIG. 12 is a conceptual diagram for describing a method of relaying, by the internal manager computing device 300, an on-site user computing device and the remote user computing device 200 according to an embodiment of the present disclosure.

Specifically, referring to FIG. 12, in order to transmit a security image to the remote user computing device 200, the on-site user computing device 100 may transmit the security image to the internal manager computing device 300 which can relay the exchange of various data between the on-site user computing device 100 and the remote user computing device 200.

In this case, the internal manager computing device 300 according to an embodiment may perform a role of relaying various types of communications including the transmission and reception of data related to the security image between the on-site user computing device 100 and the remote user computing device 200.

Specifically, the internal manager computing device 300 may provide an interface in which a 3D security area designated by the on-site user computing device 100 is changed.

In an embodiment, the internal manager computing device 300 may provide an interface in which a 3D security area set in the on-site user computing device 100 may be secondarily processed, and may perform a change update on the 3D security area based on a user input based on the provided interface.

Furthermore, the internal manager computing device 300 may generate a security image based on the change-updated 3D security area, and may transmit the generated security image to the remote user computing device 200.

FIG. 13 is an example in which the internal manager computing device is implemented as a table-top type computing device and sets an additional 3D security area according to an embodiment of the present disclosure.

Furthermore, referring to FIG. 13, the internal manager computing device 300 may perform a process of setting an additional 3D security area and performing security processing on the additional 3D security area.

Specifically, the internal manager computing device 300 may set an additional 3D security area and perform security processing using the same method as the method of setting, by the on-site user computing device 100, a 3D security area and performing security processing.

Detailed description of the method will be substituted with the aforementioned contents.

In this case, the internal manager computing device 300 may set the additional 3D security area through the table-top type computing device 400, and may perform the security processing on the additional 3D security area.

In an embodiment, the internal manager computing device 300 may set a 3D security area based on a drawing input obtained based on the table-top type computing device 400.

Specifically, the internal manager computing device 300 may obtain the drawing input for setting the 3D security area based on a user's drag input performed along the outskirts of a real object to be set as the 3D security area through the table-top type computing device 400.

Furthermore, the internal manager computing device 300 may perform a change update on the 3D security area based on the obtained drawing input.

Furthermore, the internal manager computing device 300 may generate a security image based on the change-updated 3D security area, and may transmit the generated security image to the remote user computing device 200.

Furthermore, the internal manager computing device 300 according to an embodiment may perform a transmission blocking function on the security image provided from the on-site user computing device 100 to the remote user computing device 200.

Specifically, if it is determined that security processing for a security image received from the on-site user computing device 100 is insufficient, the internal manager computing device 300 may activate the transmission blocking function for blocking the security image from being transmitted from the on-site user computing device 100 to the remote user computing device 200.

As described above, according to an embodiment of the present disclosure, the on-site user computing device 100 transmits a security image to the remote user computing device 200 through the internal manager computing device 300. Accordingly, the security of security images exchanged over a network can be further enhanced because the security image is dually managed and censored.

As described above, the AR remote communication method and system for providing a security function for a 3D space according to an embodiment of the present disclosure have an effect in that it can enhance the security of an image of a 3D space including specific information whose leakage to the outside is restricted by generating an image converted from a given area of the image of the 3D space transmitted or received over a network and providing a security function for the image of the 3D space.

Furthermore, the AR remote communication method and system for providing a security function for a 3D space according to an embodiment of the present disclosure has an effect in that it can flexibly set an area to which security processing will be applied in an image of a 3D space according to circumstances because a designated given area in the image of the 3D space is converted based on a user input or previously stored information and displayed differently from the existing method and a security processing function for preventing the given area or the remaining areas other than the given area from being identified is provided.

Furthermore, the AR remote communication method and system for providing a security function for a 3D space according to an embodiment of the present disclosure has an effect in that they can further enhance security by dually managing and censoring an image transmitted or received over a network because an image of a 3D space on which security processing has been performed is transmitted from the on-site user computing device to the remote user computing device 200 through the internal manager computing device 300.

Furthermore, the aforementioned embodiments according to the present disclosure may be implemented in the form of a program readable through various computer means, and may be written in a computer-readable recording medium. In this case, the computer-readable recording medium may include program instructions, a data file, and a data structure alone or in combination. The program instructions written in the computer-readable recording medium may be specially designed and constructed for the present disclosure, or may be known and available to those skilled in computer software. For example, the computer-readable recording medium include magnetic media such as a hard disk, a floppy disk and a magnetic tape, optical media such as a CD-ROM and a DVD, magneto-optical media such as a floptical disk, and hardware devices specially configured to store and execute program instructions, such as a ROM, a RAM, and a flash memory. Examples of the program instructions may include not only a machine language wire constructed by a compiler, but a high-level language wire capable of being executed by a computer using an interpreter. Such a hardware device may be configured to act as one or more software modules in order to perform an operation of the present disclosure, and vice versa.

Specific executions described in the present disclosure are embodiments and are not intended to limit the scope of the present disclosure in any method. For the simplicity of the specification, the writing of conventional electronic components, control systems, software and other functional sides of the systems may be omitted. Furthermore, the connections or connection members of the lines between the components shown in the drawings illustrate functional connections and/or physical or circuit connections. In an actual device, the connections or connection members may be substituted or may be indicated as additional various functional connections, physical connections or circuit connections. Furthermore, a component may not be a component essentially necessary for the application of the present disclosure unless a detailed reference, such as "essential" or "importantly", is given.

Furthermore, although the present disclosure has been described in the detailed description of the present disclosure with reference to the embodiments of the present disclosure, those skilled in the art or a person having ordinary knowledge in the art will appreciate that the present disclosure may be modified and changed in various ways without departing from the spirit and technical area of the present disclosure written in the claims to be described later. Accordingly, the technological scope of the present disclosure is not limited to the contents described in the detailed description of the specification, but should be determined by the claims.

The AR remote communication method and system for providing a security function for a 3D space according to an embodiment of the present disclosure have an effect in that it can enhance the security of an image of a 3D space including specific information whose leakage to the outside is restricted by generating an image converted from a given area of the image of the 3D space transmitted or received over a network and providing a security function for the image of the 3D space.

Furthermore, the AR remote communication method and system for providing a security function for a 3D space according to an embodiment of the present disclosure has an effect in that it can flexibly set an area to which security processing will be applied in an image of a 3D space according to circumstances because a designated given area in the image of the 3D space is converted based on a user input or previously stored information and displayed differently from the existing method and a security processing function for preventing the given area or the remaining areas other than the given area from being identified is provided.

Furthermore, the AR remote communication method and system for providing a security function for a 3D space according to an embodiment of the present disclosure has an effect in that they can further enhance security by dually managing and censoring an image transmitted or received over a network because an image of a 3D space on which security processing has been performed is transmitted from the on-site user computing device to the remote user computing device through the internal manager computing device.

However, effects which may be obtained in the present disclosure are not limited to the aforementioned effects, and other technical effects not described above may be evidently understood by a person having ordinary skill in the art to which the present disclosure pertains from the above description.

What is claimed is:

1. An augmented reality (AR) remote communication method of providing, by a computing device, communication within an AR environment based on an image of a three-dimensional (3D) space whose given area is secured, the method comprising:
obtaining a physical space image of a physical space around a user;
setting a 3D security area based on the obtained physical space image;
performing security processing for converting the physical space image based on the set 3D security area; and
providing a security image generated by performing the security processing,
wherein the computing device includes an on-site user computing device generating the security image, an internal manager computing device changing the security image and a remote user computing device receiving the security image changed by the internal manager computing device,
wherein setting the 3D security area based on the obtained physical space image comprises providing a 3D security area designation interface in which the 3D security area is set in the physical space image,
wherein the 3D security area designation interface comprises at least one interface of an interface in which a real object is designated in the physical space image and an interface in which 3D model information corresponding to the real object is set and 3D space information on the real object is obtained,
wherein the 3D model information includes an appearance information of the real object whose 3D security area will be set and information on a virtual object generated in a shape matched with the 3D space information of the real object,
wherein providing a security image generated by performing the security processing comprises,
transmitting the security image generated by the on-site user computing device to the internal manager computing device,
additionally changing the 3D security area of the security image based on a user's input in the internal manager computing device, and
transmitting the changed security image to the remote user computing device,
wherein the user's input is a drawing input performed by the user along the outskirts of a real object,
wherein the changing the 3D security area of the security image based on a user's input in the internal manager computing device includes,
determining if the security processing for the security image is insufficient in the internal manager computing device, and
blocking the security image determined to insufficient security processing from being transmitted from the on-site user computing device to the remote user computing device.

2. The method of claim 1, wherein setting the 3D security area based on the obtained physical space image comprises:
setting, as the 3D security area, a given area matched with the 3D space information or remaining areas other than the given area, and
displaying a blurred 3D security image of the 3D security area.

3. The method of claim 2, wherein displaying the blurred 3D security image of the 3D security area comprises:
transmitting the 3D security image to a remote user computing device,
receiving virtual content of the 3D security image from the remote user computing device, and
displaying an AR image obtained by overlaying the received virtual content on the 3D security image.

4. The method of claim 1, wherein the 3D model information is displayed on the physical space image and overlapped on the physical space image.

5. The method of claim 4, wherein setting the 3D security area based on the obtained physical space image further comprises providing a 3D model information setting interface, and
wherein the 3D model information setting interface provides a detailed shape setting so that the displayed 3D model information is implemented in a shape matched with the real object whose 3D security area will be set.

6. The method of claim 1, wherein the 3D model information is determined as a hexahedron if the real object is a rectangular box shape or the 3D model information is determined as a cylinder if the real object is a cylindrical shape.

* * * * *